United States Patent
Schindler et al.

(10) Patent No.: US 11,319,444 B2
(45) Date of Patent: May 3, 2022

(54) CROSS-LINKABLE MASSES BASED ON ORGANOPOLYSILOXANES COMPRISING ORGANYLOXY GROUPS

(71) Applicant: WACKER CHEMIE AG, Munich (DE)

(72) Inventors: Wolfram Schindler, Tuessling (DE); Michael Kaiser, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 16/605,393

(22) PCT Filed: Dec. 15, 2017

(86) PCT No.: PCT/EP2017/083075
§ 371 (c)(1),
(2) Date: Oct. 15, 2019

(87) PCT Pub. No.: WO2019/114987
PCT Pub. Date: Jun. 20, 2019

(65) Prior Publication Data
US 2021/0122920 A1     Apr. 29, 2021

(51) Int. Cl.
| | | |
|---|---|---|
| C08L 83/04 | (2006.01) | |
| C08G 77/18 | (2006.01) | |
| C08G 77/20 | (2006.01) | |
| C08K 5/5419 | (2006.01) | |
| C08K 5/5425 | (2006.01) | |

(52) U.S. Cl.
CPC ............. C08L 83/04 (2013.01); C08G 77/18 (2013.01); C08G 77/20 (2013.01); C08K 5/5419 (2013.01); C08K 5/5425 (2013.01); C08L 2203/30 (2013.01); C08L 2312/00 (2013.01)

(58) Field of Classification Search
CPC .... C08K 5/544; C08K 5/5425; C08K 5/5419; C07F 7/18; C08G 77/20; C08G 77/18; C08L 83/04
See application file for complete search history.

(56) References Cited

U.S. PATENT DOCUMENTS

| | | | |
|---|---|---|---|
| 4,942,211 A | 7/1990 | Sommer et al. | |
| 5,597,882 A | 1/1997 | Schiller et al. | |
| 6,531,621 B1 | 3/2003 | Dorsch et al. | |
| 2004/0220331 A1 | 11/2004 | Sixt et al. | |
| 2007/0282060 A1* | 12/2007 | Scholey | C08K 3/26 524/588 |
| 2016/0115318 A1* | 4/2016 | Kaji | C08K 5/5419 524/307 |

FOREIGN PATENT DOCUMENTS

| | | |
|---|---|---|
| CN | 104693805 A | 6/2015 |
| EP | 0327847 A2 | 8/1989 |
| EP | 1042400 B1 | 12/2001 |
| EP | 1479720 A1 | 11/2004 |
| EP | 1865029 A2 | 12/2007 |
| WO | 9310186 A1 | 5/1993 |

OTHER PUBLICATIONS

He Ye-ming et al., "Preparation of Polyalkoxysilyl-terminated Polysiloxane and Dealcoholized RTV-1 Silicone Rubber", Organosilicon materials, vol. 27, No. 3, pp. 175-181 and English Abstract.

* cited by examiner

Primary Examiner — Kuo Liang Peng
(74) Attorney, Agent, or Firm — Brooks Kushman P.C.

(57) ABSTRACT

Crosslinkable compositions based on organopolysiloxanes containing organyloxy groups which have improved wetting behavior, and especially improved early stability, contain
(A) organopolysiloxanes composed of units $$R_a R^1_b (OR^2)_c SiO_{(4-a-b-c)/2} \quad (I),$$

(B) organosilicon compounds $$(R^4O)_d SiR^3_{(4-d)} \quad (II),$$

and/or their partial hydrolysates,
and
(C) organosilicon compounds containing basic nitrogen $$(R^6O)_e SiR^5_{(4-e)} \quad (III),$$

and/or their partial hydrolysates.

10 Claims, No Drawings

CROSS-LINKABLE MASSES BASED ON ORGANOPOLYSILOXANES COMPRISING ORGANYLOXY GROUPS

CROSS REFERENCE TO RELATED APPLICATIONS

This application is the U.S. National Phase of PCT Appln. No. PCT/EP2017/083075 filed Dec. 15, 2017, the disclosure of which is incorporated in its entirety by reference herein.

BACKGROUND OF THE INVENTION

1. Field of the Invention

The invention relates to crosslinkable compositions based on organopolysiloxanes containing organyloxy groups, featuring improved wetting behavior, especially improved early stability, to methods for producing them, and to their use.

2. Description of the Related Art

One-component (RTV-1) sealants which are storable with exclusion of water but undergo vulcanization to elastomers upon exposure to water have been known for a long time. These products are employed in large quantities, for example, in the construction industry, as sealants for connecting ordinary joints or façade joints, or can be applied as elastic coatings. These mixtures are based on polymers terminated with silyl groups which carry reactive substituents such as OH groups or hydrolyzable groups, such as alkoxy groups, for example. Furthermore, these sealants may comprise fillers, plasticizers, crosslinkers, catalysts, and additives. Reference may be made in this regard, for example, to EP-A 327847, EP-A 1865029, EP-A 1479720 and EP-A 1042400. Alkoxy-RTV-1 compositions are preferred on account of their neutral and odorless crosslinking and the very good adhesion to different substrates, relative to other neutral systems. These formulations often cure unevenly through their volume, with the possible consequence, particularly in the early stage of curing, of cracking or blistering, especially if the joints are also still moving. This is referred to as a lack of early stability, and under adverse conditions, such as low temperatures or low atmospheric humidity, can lead to failure of the sealing function.

The object, then, was to provide crosslinkable compositions, based on organopolysiloxanes containing organyloxy groups, which exhibit improved wetting behavior, including enhanced early stability.

SUMMARY OF THE INVENTION

The invention provides crosslinkable compositions comprising (A) Organopolysiloxanes containing organyloxy groups and composed of units of the formula (I)

where
R may be identical or different and represents monovalent, SiC-bonded, optionally substituted hydrocarbyl radicals that are free from aliphatic carbon-carbon multiple bonds,
$R^1$ may be identical or different and denotes monovalent, SiC-bonded, optionally substituted hydrocarbyl radicals having aliphatic carbon-carbon multiple bonds,
$R^2$ may be identical or different and denotes monovalent, optionally substituted hydrocarbyl radicals, a is 0, 1, 2 or 3,
b is 0 or 1, and
c is 0, 1, 2 or 3,
with the proviso that in formula (I) the sum $a+b+c \leq 3$ and b and c are other than 0 in at least one unit,
(B) organosilicon compounds of the formula (II)

where
$R^3$ may be identical or different and denotes monovalent, SiC-bonded, optionally substituted hydrocarbyl radicals,
$R^4$ may be identical or different and denotes hydrogen atom or monovalent, optionally substituted hydrocarbyl radicals, and
d is 2, 3 or 4, preferably 3 or 4, more preferably 3,
with the proviso that in organosilicon compound (B) there is at least one radical $R^4$ having at least two carbon atoms, and/or their partial hydrolysates,
and
(C) organosilicon compounds containing basic nitrogen and of the formula (III)

where
$R^5$ may be identical or different and denotes monovalent, SiC-bonded radicals containing basic nitrogen,
$R^6$ may be identical or different and denotes hydrogen atom or monovalent, optionally substituted hydrocarbyl radicals, and
e is 2 or 3, preferably 3,
and/or their partial hydrolysates.

DETAILED DESCRIPTION OF THE PREFERRED EMBODIMENTS

In the context of the present invention, the term "organopolysiloxanes" is intended to encompass polymeric, oligomeric, and dimeric siloxanes.

The crosslinkable compositions are preferably compositions which can be crosslinked by condensation reactions.

In the context of the present invention, the designation "condensation reaction" is intended also to encompass any preceding hydrolysis step.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals, such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl radical and methylcyclohexyl radicals; aryl radicals such as the phenyl, naphthyl, anthryl, and phenanthryl radicals; alkaryl radicals such as the o-, m-, and p-tolyl radicals; xylyl radicals and ethylphenyl radicals; and aralkyl radicals such as the benzyl radical, and the α- and β-phenylethyl radicals.

Examples of substituted radicals R are the methoxyethyl, ethoxyethyl, ethoxyethoxyethyl radicals or polyoxyalkyl radicals such as the polyethylene glycol or polypropylene glycol radicals.

Radical R preferably comprises monovalent hydrocarbyl radicals having 1 to 18 carbon atoms that are free from aliphatic carbon-carbon multiple bonds and that are optionally substituted by halogen atoms, amino groups, ether groups, ester groups, epoxy groups, mercapto groups, cyano groups or (poly)glycol radicals, and more preferably comprises monovalent hydrocarbyl radicals having 1 to 12 carbon atoms that are free from aliphatic carbon-carbon multiple bonds, more particularly the methyl radical.

Examples of radicals $R^1$ are alkenyl radicals, such as linear or branched 1-alkenyl radicals such as the vinyl radical and 1-propenyl radical and also the 2-propenyl radical.

Radical $R^1$ preferably comprises monovalent hydrocarbyl radicals having 1 to 18 carbon atoms that have aliphatic carbon-carbon multiple bonds and that are optionally substituted by halogen atoms, amino groups, ether groups, ester groups, epoxy groups, mercapto groups, cyano groups or (poly)glycol radicals, and more preferably comprises monovalent hydrocarbyl radicals having 1 to 12 carbon atoms and having aliphatic carbon-carbon multiple bonds, and more particularly the vinyl radical.

Examples of radicals $R^2$ are the monovalent radicals stated for R and $R^1$.

Radical $R^2$ preferably comprises monovalent, optionally substituted hydrocarbyl radicals having 1 to 12 carbon atoms that may be interrupted by oxygen atoms, and more preferably comprises alkyl radicals having 1 to 6 carbon atoms, yet more particularly the methyl or ethyl radical, and most preferably the methyl radical.

Organopolysiloxanes (A) used in accordance with the invention are preferably substantially linear, organyloxy-terminated organopolysiloxanes, more preferably those of the formula (IV)

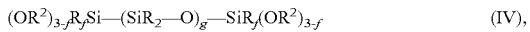

(IV), where

R, $R^1$, and $R^2$ may each be identical or different, and have one of the definitions stated above, g is 30 to 5000, and f is 0, 1 or 2, preferably 1, with the proviso that in formula (IV) f is other than 0 in at least one unit.

Although not specified in formula (IV), the organopolysiloxanes (A) of the formula (IV) that are used in accordance with the invention may contain, resulting from their preparation, a small proportion of branching, preferably up to a maximum of 500 ppm of all the Si units, and more particularly, none.

Although not specified in the formulae (I) and (IV), the organopolysiloxanes (A) used in accordance with the invention may contain, resulting from their preparation, a small proportion of hydroxyl groups, preferably up to a maximum of 5% of all Si-bonded radicals.

Preferred examples of organopolysiloxanes (A) are
(MeO)$_2$MeSiO[SiMe$_2$O]$_{200-2000}$SiVi(OMe)$_2$
(MeO)$_2$ViSiO[SiMe$_2$O]$_{200-2000}$SiVi(OMe)$_2$,
(MeO)$_2$MeSiO[SiMe$_2$O]$_{200-2000}$SiViMe(OMe),
(MeO) ViMeSiO[SiMe$_2$O]$_{200-2000}$SiViMe(OMe) or
(MeO) ViMeSiO[SiMe$_2$O]$_{200-2000}$SiVi(OMe)$_2$, where
(MeO)$_2$MeSiO[SiMe$_2$O]$_{200-2000}$SiVi(OMe)$_2$ or
(MeO)$_2$ViSiO[SiMe$_2$O]$_{200-2000}$SiVi(OMe)$_2$ are particularly preferred, more particularly (MeO)$_2$ViSiO[SiMe$_2$O]$_{200-2000}$SiVi(OMe)$_2$.

The organopolysiloxanes (A) used in accordance with the invention preferably have a viscosity of 104 to $10^6$ mPas, more preferably 50,000 to 500,000 mPas, in each case at 25° C.

The organopolysiloxanes (A) are commercially customary products and/or can be prepared and isolated by methods commonplace within silicon chemistry, prior to blending.

Examples of radicals $R^3$ are the monovalent radicals stated for R and $R^1$.

Radical $R^3$ preferably comprises monovalent hydrocarbyl radicals having 1 to 12 carbon atoms that are optionally substituted by ether groups, ester groups, (poly)glycol radicals or triorganyloxysilyl groups, and more preferably comprises alkyl radicals having 1 to 12 carbon atoms or alkenyl radicals having 1 to 12 carbon atoms, and most preferably comprises the methyl radical and the vinyl radical.

Examples of radicals $R^4$ are hydrogen and the monovalent radicals stated for R and $R^1$.

Radical $R^4$ preferably comprises monovalent, optionally substituted hydrocarbyl radicals having 1 to 12 carbon atoms, that may be interrupted by oxygen atoms, and more preferably comprises alkyl radicals having 1 to 6 carbon atoms, yet more preferably the methyl or ethyl radical, and most preferably the ethyl radical.

The organosilicon compounds (B) used in the compositions of the invention are preferably silanes having at least one ethoxy radical or their partial hydrolysates, more preferably tetraethoxysilane, methyltriethoxysilane, dimethyldiethoxysilane, vinyltriethoxysilane, vinylmethyldiethoxysilane, phenyltriethoxysilane, phenylmethyldiethoxysilane or 1,2-bis(triethoxysilyl)ethane or their partial hydrolysates, more particularly tetraethoxysilane, methyltriethoxysilane or vinyltriethoxysilane or their partial hydrolysates, yet more preferably methyltriethoxysilane or vinyltriethoxysilane or their partial hydrolysates, and most preferably vinyltriethoxysilane or its partial hydrolysates.

The partial hydrolysates (B) may be partial homohydrolysates, i.e., partial hydrolysates of one kind of organosilicon compound of the formula (II), or also partial cohydrolysates, i.e., partial hydrolysates of at least two different kinds of organosilicon compounds of the formula (II).

Where the compounds (B) used in the compositions of the invention are partial hydrolysates of organosilicon compounds of the formula (II), those having up to ten silicon atoms are preferred.

The crosslinkers (B) used optionally in the compositions of the invention are commercially customary products and/or can be prepared by methods that are known within silicon chemistry.

The compositions of the invention preferably comprise component (B) in amounts of 0.5 to 15.0 parts by weight, more preferably 0.5 to 10.0 parts by weight, and most preferably 1.0 to 3.5 parts by weight, based in each case on 100 parts by weight of organopolysiloxanes (A).

Examples of radicals $R^5$ are radicals of the formulae
$H_2NCH_2$—, $H_2N(CH_2)_2$—, $H_2N(CH_2)_3$—, $H_2N(CH_2)_2NH(CH_2)_2$—, $H_2N(CH_2)_2NH(CH_2)_3$—, $H_2N(CH_2)_2NH(CH_2)_2NH(CH_2)_3$—, $H_3CNH(CH_2)_3$—, $C_2H_5NH(CH_2)_3$—, $H_3CNH(CH_2)_2$—, $C_2H_5NH(CH_2)_2$—, $H_2N(CH_2)_4$—, $H_2N(CH_2)_5$—, $H(NHCH_2CH_2)_3$—, $C_4H_9NH(CH_2)_2NH(CH_2)_2$—, cyclo-$C_6H_{11}NH(CH_2)_3$—, cyclo-$C_6H_{11}NH(CH_2)_2$—, $(CH_3)_2N(CH_2)_3$—, $(CH_3)_2N(CH_2)_2$—, $(C_2H_5)_2N(CH_2)_3$— and $(C_2H_5)_2N(CH_2)_2$—.

Radical $R^5$ preferably comprises $H_2N(CH_2)_3$—, $H_2N(CH_2)_2NH(CH_2)_3$—, $H_3CNH(CH_2)_3$—, $C_2H_5NH(CH_2)_3$— or cyclo-$C_6H_{11}NH(CH_2)_3$— radical, more preferably the $H_2N(CH_2)_2NH(CH_2)_3$— radical.

Examples of radical $R^6$ are hydrogen and also the examples stated for radical $R^2$.

Radical $R^6$ preferably comprises monovalent, optionally substituted hydrocarbyl radicals having 1 to 12 carbon atoms, that may be interrupted by oxygen atoms, and more preferably comprises alkyl radicals having 1 to 6 carbon atoms, and most preferably the methyl or ethyl radical.

The organosilicon compounds (C) are preferably 3-aminopropyltrimethoxysilane, 3-aminopropyltriethoxysilane, 3-aminopropylmethyldimethoxysilane, 3-aminopropylmethyldiethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-phenyl-3-aminopropyltrimethoxysilane, N-phenyl-3-aminopropylmethyldimethoxysilane, N-phenyl-3-aminopropyltriethoxysilane or N-phenyl-3-aminopropylmethyldiethoxysilane, or further N-alkyl or N,N-dialkyl derivatives of 3-aminopropyltrimethoxysilane, 3-aminopropyltriethoxysilane, 3-aminopropylmethyldimethoxysilane or 3-aminopropylmethyldiethoxysilane or their partial hydrolysates, where the stated N-alkyl radicals are preferably methyl, ethyl, n-propyl, isopropyl, n-butyl, isobutyl, tert-butyl, cyclohexyl or the various branched or unbranched pentyl or hexyl radicals.

The compounds (C) are more preferably 3-aminopropyltrimethoxysilane, 3-aminopropyltriethoxysilane, N-(2-aminoethyl)-3-aminopropyltrimethoxysilane or N-(2-aminoethyl)-3-aminopropyltriethoxysilane, most preferably N-(2-aminoethyl)-3-aminopropyltrimethoxysilane or N-(2-aminoethyl)-3-aminopropyltriethoxysilane.

The compounds (C) used in the compositions of the invention are commercially customary products and/or can be prepared by methods that are known within silicon chemistry.

The compositions of the invention preferably comprise component (C) in amounts of 0.5 to 15.0 parts by weight, more preferably 0.5 to 5.0 parts by weight, most preferably 0.5 to 3.0 parts by weight, based in each case on 100 parts by weight of organopolysiloxanes (A).

The weight ratio of component (B) to component (C) is preferably in the range from 2:1 to 1:2, more preferably in the range from 3:2 to 2:3.

In addition to the components (A), (B) and (C), the compositions of the invention may comprise all further substances which are useful in compositions which can be crosslinked by condensation reaction; examples of such further substances include (D) plasticizers, (E) fillers, (F) catalysts, (G) stabilizers, and (H) additives.

Examples of optionally employed plasticizers (D) are dimethylpolysiloxanes which are liquid at room temperature under a pressure of 1013 hPa and are terminated with trimethylsiloxy groups, in particular having viscosities at 25° C. in the range between 20 and 5000 mPas; organopolysiloxanes which are liquid at room temperature under a pressure of 1013 hPa and consist substantially of $SiO_{3/2}$, $SiO_{2/2}$, and $SiO_{1/2}$ units, referred to as T, D, and M units; and also high-boiling hydrocarbons, such as, for example, paraffin oils or mineral oils consisting substantially of naphthenic and paraffinic units.

The optionally employed plasticizer (D) preferably comprises linear polydimethylsiloxanes having trimethylsilyl end groups.

If the compositions of the invention do include plasticizers (D), the amounts are preferably 10 to 300 parts by weight, more preferably 10 to 200 parts by weight, and most preferably 20 to 100 parts by weight, based in each case on 100 parts by weight of organopolysiloxane (A). Preferably, the compositions of the invention do include component (D).

Examples of fillers (E) are nonreinforcing fillers, these being fillers having a BET surface area of up to 50 m²/g, such as uncoated calcium carbonates, coated calcium carbonates, quartz, diatomaceous earth, calcium silicate, zirconium silicate, zeolites, metal oxide powders, such as aluminum, titanium, iron or zinc oxides and/or their mixed oxides, barium sulfate, gypsum, silicon nitride, silicon carbide, boron nitride, or glass powders and polymeric powders, such as polyacrylonitrile powders. Examples of reinforcing fillers, these being fillers having a BET surface area of more than 50 m²/g, are pyrogenically produced silica, precipitated silica, carbon blacks, such as furnace black and acetylene black, and mixed silicon-aluminum oxides of high BET surface area. It is also possible, furthermore, to use fibrous fillers such as asbestos, or polymeric fibers. The stated fillers may have been hydrophobized, by treatment, for example, with organosilanes and/or organosiloxanes, stearic acid derivative, or by etherification of hydroxyl groups to alkoxy groups.

If fillers (E) are used, they are preferably untreated calcium carbonates, hydrophilic, pyrogenically produced silica, or hydrophobic, pyrogenically produced silica.

If the compositions of the invention do include fillers (E), the amounts are preferably 10 to 500 parts by weight, more preferably 10 to 200 parts by weight, and most preferably 50 to 200 parts by weight, based in each case on 100 parts by weight of organopolysiloxane (A).

As catalyst (F) it is possible to use all curing accelerators which are useful in compositions which can be crosslinked by condensation reaction. Examples of optionally employed catalysts (F) are organotin compounds such as di-n-butyltin dilaurate and di-n-butyltin diacetate, di-n-butyltin oxide, dioctyltin diacetate, dioctyltin dilaurate, dioctyltin oxide, and also reaction products of these compounds with alkoxysilanes, and organo-functional alkoxysilanes, such as tetraethoxysilane and aminopropyltriethoxysilane; preferred are di-n-butyltin dilaurate, dioctyltin dilaurate, reaction products of dibutyltin oxide and dioctyltin oxide with tetraethyl silicate hydrolysate or mixed hydrolysates with aminopropylsilanes, preferably di-n-butyltin oxide in tetraethyl silicate hydrolysate.

If the compositions of the invention do include catalysts (F), which is preferred, the amounts are preferably 0.01 to 3 parts by weight, more preferably 0.05 to 2 parts by weight, based in each case on 100 parts by weight of organopolysiloxane (A).

Preferred examples of stabilizers (G) are phosphoric acid, phosphonic acids, phosphonic acid alkyl esters, and phosphoric acid alkyl esters.

If the compositions of the invention do include stabilizers (G), which is preferred, the amounts are preferably 0.01 to 100 parts by weight, more preferably 0.1 to 30 parts by weight, and most preferably 0.3 to 10 parts by weight, based in each case on 100 parts by weight of organopolysiloxane (A).

Examples of additives (H) are pigments, dyes, odorants, oxidation inhibitors, agents for influencing the electrical properties, such as conductive carbon black, flame retardants, light stabilizers, fungicides, heat stabilizers, scavengers, such as Si—N-containing silazanes or silylamides, cocatalysts, thixotropic agents, such as, for example, polyethylene glycols, polypropylene glycols or copolymers thereof, organic solvents, such as alkyl aromatics, paraffin oils, and also any desired siloxanes different from component (A).

If the compositions of the invention do include additives (H), the amounts are preferably 0.01 to 100 parts by weight, more preferably 0.1 to 30 parts by weight, most preferably 0.3 to 10 parts by weight, based in each case on 100 parts by weight of organopolysiloxane (A).

The compositions of the invention are preferably compositions comprising (A) organopolysiloxanes composed of units of the formula (I), (B) organosilicon compounds of the formula (II) having at least one ethyl radical $R^4$ and/or their partial hydrolysates, (C) organosilicon compounds containing basic nitrogen and of the formula (III) and/or their partial hydrolysates, optionally (D) plasticizers, optionally (E) fillers, optionally (F) catalysts, optionally (G) stabilizers, and optionally (H) additives.

The compositions of the invention are more preferably compositions comprising (A) organopolysiloxanes of the formula (IV) where $R^1$ is vinyl radical, (B) organosilicon compounds of the formula (II) having at least one ethyl radical $R^4$ and/or their partial hydrolysates, (C) organosilicon compounds containing basic nitrogen and of the formula (III) selected from N-(2-aminoethyl)-3-aminopropyltrimethoxysilane and N-(2-aminoethyl)-3-aminopropyltriethoxysilane, and their partial hydrolysates, (D) plasticizers, optionally (E) fillers, optionally (F) catalysts, (G) stabilizers, and optionally (H) additives, with the proviso that the weight ratio of component (B) to component (C) is preferably in the range from 2:1 to 1:2.

The compositions of the invention are more particularly compositions comprising (A) organopolysiloxanes selected from the compounds
$(MeO)_2MeSiO[SiMe_2O]_{200-2000}SiVi(OMe)_2$
$(MeO)_2ViSiO[SiMe_2O]_{200-2000}SiVi(OMe)_2$,
$(MeO)_2MeSiO[SiMe_2O]_{200-2000}SiViMe(OMe)$,
$(MeO)ViMeSiO[SiMe_2O]_{200-2000}SiViMe(OMe)$ and
$(MeO)ViMeSiO[SiMe_2O]_{200-2000}SiVi(OMe)_2$, (B) organosilicon compounds selected from the compounds tetraethoxysilane, methyltriethoxysilane, dimethyldiethoxysilane, vinyltriethoxysilane, vinylmethyldiethoxysilane, phenyltriethoxysilane, phenylmethyldiethoxysilane, 1,2-bis(triethoxysilyl)ethane or their partial hydrolysates, more particularly tetraethoxysilane, methyltriethoxysilane, and vinyltriethoxysilane, and their partial hydrolysates, (C) organosilicon compounds containing basic nitrogen and selected from N-(2-aminoethyl)-3-aminopropyltrimethoxysilane and N-(2-aminoethyl)-3-aminopropyltriethoxysilane, and their partial hydrolysates, (D) plasticizers, optionally (E) fillers, (F) catalysts, (G) stabilizers, and optionally (H) additives, with the proviso that the weight ratio of component (B) to component (C) is preferably in the range from 2:1 to 1:2.

In a further, more particularly preferred embodiment, the compositions of the invention are compositions comprising (A) organopolysiloxanes selected from the compounds
$(MeO)_2MeSiO[SiMe_2O]_{200-2000}SiVi(OMe)_2$ and
$(MeO)_2ViSiO[SiMe_2O]_{200-2000}SiVi(OMe)_2$, (B) organosilicon compounds selected from the compounds tetraethoxysilane, methyltriethoxysilane, and vinyltriethoxysilane, and also their partial hydrolysates, (C) organosilicon compounds containing basic nitrogen and selected from N-(2-aminoethyl)-3-aminopropyltrimethoxysilane and N-(2-aminoethyl)-3-aminopropyltriethoxysilane, and their partial hydrolysates, (D) plasticizers, optionally (E) fillers, (F) catalysts, (G) stabilizers, and optionally (H) additives, with the proviso that the weight ratio of component (B) to component (C) is preferably in the range from 2:1 to 1:2.

In another more particularly preferred embodiment, the compositions of the invention are compositions comprising (A) $(MeO)_2MeSiO[SiMe_2O]_{200-2000}SiVi(OMe)_2$ and $(MeO)_2ViSiO[SiMe_2O]_{200-2000}SiVi(OMe)_2$, (B) organosilicon compounds selected from the compounds methyltriethoxysilane and vinyltriethoxysilane, and their partial hydrolysates, (C) organosilicon compounds containing basic nitrogen and selected from N-(2-aminoethyl)-3-aminopropyltrimethoxysilane and N-(2-aminoethyl)-3-aminopropyltriethoxysilane, and their partial hydrolysates, (D) plasticizers, optionally (E) fillers, (F) catalysts, (G) stabilizers, and optionally (H) additives, with the proviso that the weight ratio of component (B) to component (C) is preferably in the range from 2:1 to 1:2.

In another more particularly preferred embodiment, the compositions of the invention are compositions comprising (A) $(MeO)_2ViSiO[SiMe_2O]_{200-2000}SiVi(OMe)_2$, (B) vinyltriethoxysilane and/or its partial hydrolysates, (C) organosilicon compounds containing basic nitrogen and selected from N-(2-aminoethyl)-3-aminopropyltrimethoxysilane and N-(2-aminoethyl)-3-aminopropyltriethoxysilane, and their partial hydrolysates, (D) plasticizers, optionally (E) fillers, (F) catalysts, (G) stabilizers, and optionally (H) additives, with the proviso that the weight ratio of component (B) to component (C) is preferably in the range from 3:2 to 2:3.

The compositions of the invention preferably contain no further constituents beyond the components (A) to (H).

The individual constituents of the compositions of the invention may in each case comprise one kind of such a constituent or else a mixture of at least two different kinds of such constituents.

The compositions of the invention comprise a liquid or viscous mixture, and preferably are viscid to pasty compositions.

The compositions of the invention may be prepared by mixing all of the constituents with one another in any order.

A further subject of the present invention is a method for producing the compositions of the invention by mixing the individual components in any order.

This mixing may take at room temperature under the pressure of the surrounding atmosphere, in other words about 900 to 1100 hPa. If desired, however, this mixing may also take place at higher temperatures, as for example at temperatures in the range from 35 to 100° C. It is possible, moreover, to carry out mixing occasionally or continuously under reduced pressure, such as at absolute pressure of 30 to 500 hPa, for example, in order to remove volatile compounds or air.

Preferably, the components (A), (B), (C), and optionally plasticizer (D), preferably a trimethylsilyl-terminated organopolysiloxane, are mixed. This may occur under the pressure of the atmosphere or else under reduced pressure. Subsequently it is possible to mix in fillers (E) and to carry out dispersing in the mixer with relatively strong shearing at relatively high rotary speeds. This is generally done under reduced pressure in order to remove volatile compounds, air, and reaction products of the moisture of the fillers with components (B) and (C). Further constituents, such as stabilizers (G) or additives (H), may be added before or together with the fillers (E). If catalyst (F) is used, it is stirred in homogeneously at the end. This is generally done under reduced pressure, in order to make the pasty compositions bubble-free.

The customary water content of the air is sufficient to crosslink the compositions of the invention. Crosslinking of the compositions of the invention is preferably accomplished at room temperature. It may, if desired, also be carried out at temperatures higher or lower than room temperature, as for example at −5° to 15° C. or at 30° C. to 50° C., and/or by means of concentrations of water that exceed the normal water content of the air. The direct admixing of water or hydrous substances is also possible.

The crosslinking is preferably carried out at a pressure of 100 to 1100 hPa, more particularly under the pressure of the surrounding atmosphere, in other words about 900 to 1100 hPa.

A further subject of the present invention are moldings produced by crosslinking the compositions of the invention.

The compositions of the invention can be used for any purposes for which it is possible to use compositions that are storable with exclusion of water and crosslink to elastomers at room temperature when water is admitted.

The compositions of the invention are outstandingly suitable, for example, as sealing compounds for joints, including perpendicular joints, and similar gaps of, for example, 10 to 40 mm in clear width, in—for example—buildings and land, water, and air vehicles, or as adhesives or cementing compounds, in window construction or in the manufacture of glass cabinets, for example, and also, for example, for producing elastic protective coatings, including those for surfaces exposed continually to sunlight, rainwater, freshwater or salt water, or anti-slip coverings or rubber-elastic moldings, and also for the insulation of electrical or electronic apparatus. Furthermore, the compositions of the invention are also suitable for producing coatings on surfaces that are applied by brush or roller or else can be applied by spraying.

The compositions of the invention have the advantage that they are easy to produce and are distinguished by very high storage stability.

Furthermore, the compositions of the invention have the advantage that they have very good handling qualities during application and exhibit excellent processing properties across a plethora of applications.

The compositions of the invention have the advantage, moreover, that they exhibit enhanced early stability on crosslinking.

The compositions of the invention have the advantage that they cure effectively even under different climatic conditions. The crosslinking, accordingly, is more independent of the ambient temperature and the atmospheric humidity. At the same time, the compositions of the invention with sufficient rapidity develop an internal strength (cohesion) which prevents the partially vulcanized compositions from rupturing or blistering as a result, for example, of shrinkage or of movements in the substrate, which would cause them to lose their sealing function.

Unless otherwise stated, the examples which follow are carried out at a pressure of the surrounding atmosphere, in other words approximately at 1000 hPa, and at room temperature, in other words at approximately 23° C., and/or at a temperature which comes about when the components are combined at room temperature without additional heating or cooling, and also at a relative atmospheric humidity of approximately 50%. Furthermore, all figures for parts of percentages, unless otherwise stated, are by weight.

The skin-forming times are determined on extruded sealant beads 1 cm thick, by using a freshly sharpened pencil of hardness HB to contact the surface at a shallow angle at regular intervals. In this case, if material no longer remains hanging from the tip of the pencil when the pencil is slowly raised, and a fine skin lifts off, the time is recorded. After one day, the quality of the vulcanization is additionally examined on the basis of the tackiness of the surface and the tear strength of the sealant beads (fingernail test).

Curing through volume is determined using the so-called wedge method. In this method the material is introduced uniformly into a Teflon block milled to a depth of 0-10 mm and is tested daily by lifting of the bead from the shallow end. The depth at which the bead still remains hanging with tack to the base is recorded.

For investigating the mechanical properties of the cured compositions, the paste is applied by knife or doctor blade, in thin layers, to a poorly adhering substrate, and is cured over 14 days at 23° C. and 50% relative atmospheric humidity. For this purpose Teflon molds which are cut out to a depth of 2 mm and filled completely with the composition are preferably used, the surface being made uniformly smooth by a doctor blade prior to curing.

The mechanical values were determined in accordance with ISO 37 on S2 specimens.

The Shore A hardness was determined in accordance with ISO 868.

The early stability of the pasty compositions is determined by means of a test known as the bead fold test.

On a thin cardboard strip, a bead 10 mm in diameter and 10 cm in length is applied and is drawn off to a layer thickness of 6 mm with a doctor blade. The test specimen is stored and tested in a conditioned space at 23° C. and 50% relative atmospheric humidity. The bead is tested at 30-minute intervals until a positive evaluation is possible. For the testing, the strip, at a location not yet folded, is first bent backward by 90°, over a table edge, for example, and assessed. If the bead remains unharmed for 10 seconds, with no tears, the strip is folded completely by 180° and assessed again after a further 10 seconds. If the skin ruptures on the surface, the test is negative (neg.). If the skin remains on the surface, the test is positive (pos.).

For the assessment it is vital to consider the skin-forming time as well. In terms of timing, the early stability cannot be measured until well after skin-forming is present.

Example 1

360 g of a polydimethylsiloxane with dimethoxyvinylsilyl end groups and of a viscosity of 100 000 mPa·s, 168 g of a trimethylsilyl-end-terminated polydimethylsiloxane with a viscosity of 1000 mPa·s, 1.8 g of an octylphosphonic acid mixture composed of 25% trimethoxymethylsilane and 75% octylphosphonic acid, 6.0 g of vinyltriethoxysilane, and 9.0 g of N-aminoethylaminopropyltrimethoxysilane are homogenized in a laboratory planetary mixer for a duration of 3 minutes at about 300 rpm and a pressure of 200-300 hPa. Then 54 g of a hydrophilic, pyrogenic silica having a specific surface area of 150 m²/g are mixed in slowly at a pressure of 900-1100 hPa and dispersed for 8 minutes at 800 rpm and a pressure of 200-300 hPa. Lastly, the resulting paste is activated with 1.5 g of a tin catalyst, prepared by reaction of di-n-butyltin oxide and tetraethoxysilane, at 300 rpm and a pressure of 200-300 hPa for 3 minutes and stirred to remove bubbles.

The composition thus produced was dispensed for keeping into moisture-tight containers and prior to the further tests was stored at 23° and 50% relative atmospheric humidity for 24 hours.

The resulting compositions are thereafter investigated as described or crosslinked at 23° C. and 50% relative atmospheric humidity for 14 days, with the mechanical properties and Shore hardnesses being determined according to ISO 37 and ISO 868, respectively. The results are found in table 1.

Example 2

The procedure described in example 1 is repeated with the modification that instead of 6.0 g of vinyltriethoxysilane, 12.0 g of vinyltriethoxysilane are used.

The results are found in table 1.

Example 3

The procedure described in example 2 is repeated with the modification that instead of 9.0 g of N-aminoethylaminopropyltrimethoxysilane, 9.0 g of N-aminoethylaminopropyltriethoxysilane are used.

The results are found in table 1.

Example 4

The procedure described in example 2 is repeated, with the modification that instead of 1.5 g of a tin catalyst prepared by reaction of di-n-butyltin oxide and tetraethoxysilane, 3.6 g of a tin catalyst prepared by reaction of dioctyltin oxide with tetraethoxysilane and aminopropyltrimethoxysilane were used as catalyst.

The results are found in table 1.

TABLE 1

| | Examples 1-4 | | | |
|---|---|---|---|---|
| Example | 1 | 2 | 3 | 4 |
| Paste properties | | | | |
| Skin-forming time [min] | 16 | 18 | 20 | 15 |
| Tackiness | pos. | pos. | pos. | pos. |
| Early stability | | | | |
| 30 min | neg. | neg. | neg. | neg. |
| 60 min | neg. | pos. | pos. | pos. |
| 90 min | pos. | | | |
| 120 min | | | | |
| 150 min | | | | |
| Volume curing (wedge method) | | | | |
| 1 day [mm] | 3.3 | 3.2 | 3 | 3 |
| 2 days [mm] | 4.9 | 4.6 | 4.5 | 4.8 |
| 3 days [mm] | 6.2 | 5.6 | 6 | 5.8 |
| Mechanical properties of foil to ISO 37-S2 | | | | |
| 100% modulus [MPa] | 0.28 | 0.28 | 0.34 | 0.35 |
| Tensile strength [MPa] | 1.54 | 1.33 | 1.35 | 1.32 |
| Elongation at break [%] | 615 | 534 | 497 | 508 |
| Shore A hardness to ISO 868 | | | | |
| Shore A top | 19.4 | 20.9 | 20.9 | 21.7 |
| Shore A bottom | 14.3 | 13.9 | 14.0 | 14.3 |

Comparative Examples C1-C4

The procedure described in examples 1-4 is repeated, with the modification that instead of vinyltriethoxysilane, vinyltrimethoxysilane is used.

The results are found in table 2.

TABLE 2

| | Comparative examples C1-C4 | | | |
|---|---|---|---|---|
| Comparative example | C1 | C2 | C3 | C4 |
| Paste properties | | | | |
| Skin-forming time [min] | 9 | 8 | 11 | 11 |
| Tackiness | pos. | pos. | pos. | pos. |
| Early stability | | | | |
| 30 min | neg. | neg. | neg. | neg. |
| 60 min | neg. | neg. | neg. | neg. |
| 90 min | neg. | neg. | neg. | neg. |
| 120 min | neg. | neg. | neg. | neg. |
| 150 min | neg. | neg. | pos. | neg. |
| Volume curing (wedge method) | | | | |
| 1 day [mm] | 3.2 | 2.9 | 2.5 | 2.5 |
| 2 days [mm] | 4.7 | 4.2 | 4 | 4 |
| 3 days [mm] | 5.8 | 5.4 | 5.1 | 5.1 |
| Mechanical properties of foil to ISO 37-S2 | | | | |
| 100% modulus [MPa] | 0.31 | 0.34 | 0.33 | 0.30 |
| Tensile strength [MPa] | 0.79 | 1.39 | 1.27 | 1.23 |
| Elongation at break [%] | 353 | 579 | 537 | 507 |
| Shore A hardness to ISO 868 | | | | |
| Shore A top | 21.0 | 21.9 | 19.4 | 23.4 |
| Shore A bottom | 14.1 | 14.4 | 9.8 | 15.0 |

Examples 5-8

The procedure described in examples 1-4 is repeated, with the modification that instead of vinyltriethoxysilane, methyltriethoxysilane is used.

The results are found in table 3.

TABLE 3

Examples 5-8

| Example | 5 | 6 | 7 | 8 |
|---|---|---|---|---|
| Paste properties | | | | |
| Skin-forming time [min] | 9 | 7 | 7 | 12 |
| Tackiness | pos. | pos. | pos. | pos. |
| Early stability | | | | |
| 30 min | neg. | neg. | pos. | neg. |
| 60 min | neg. | pos. | | pos. |
| 90 min | pos. | | | |
| 120 min | | | | |
| 150 min | | | | |
| Volume curing (wedge method) | | | | |
| 1 day [mm] | 3.8 | 3.6 | 4.2 | 3.7 |
| 2 days [mm] | 5.4 | 5.1 | 5.7 | 5.1 |
| 3 days [mm] | 6.4 | 6.0 | 6.8 | 6.1 |
| Mechanical properties of foil to ISO 37-S2 | | | | |
| 100% modulus [MPa] | 0.30 | 0.34 | 0.33 | 0.32 |
| Tensile strength [MPa] | 1.43 | 1.29 | 1.29 | 1.29 |
| Elongation at break [%] | 670 | 545 | 534 | 536 |
| Shore A hardness to ISO 868 | | | | |
| Shore A top | 19.1 | 20.4 | 19.7 | 21.0 |
| Shore A bottom | 14.3 | 15.2 | 14.8 | 14.6 |

Comparative Examples C5-C8

The procedure described in examples 5-8 is repeated, with the modification that instead of methyltriethoxysilane, methyltrimethoxysilane is used.

The results are found in table 4.

TABLE 4

Comparative examples C5-C8

| Comparative example | C5 | C6 | C7 | C8 |
|---|---|---|---|---|
| Paste properties | | | | |
| Skin-forming time [min] | 11 | 8 | 12 | 12 |
| Tackiness | pos. | pos. | pos. | pos. |
| Early stability | | | | |
| 30 min | neg. | neg. | neg. | neg. |
| 60 min | neg. | neg. | neg. | neg. |
| 90 min | neg. | neg. | pos. | pos. |
| 120 min | neg. | pos. | | |
| 150 min | neg. | | | |
| Volume curing (wedge method) | | | | |
| 1 day [mm] | 3.0 | 3.5 | 3.7 | 2.5 |
| 2 days [mm] | 5.1 | 4.8 | 5.3 | 3.8 |
| 3 days [mm] | 6.0 | 6.0 | 6.2 | 5.8 |
| Mechanical properties of foil to ISO 37-S2 | | | | |
| 100% modulus [MPa] | 0.23 | 0.33 | 0.29 | 0.27 |
| Tensile strength [MPa] | 1.14 | 1.35 | 1.24 | 1.40 |
| Elongation at break [%] | 540 | 559 | 545 | 557 |
| Shore A hardness to ISO 868 | | | | |
| Shore A top | 20.1 | 21.4 | 20.8 | 22.5 |
| Shore A bottom | 13.6 | 12.9 | 13.0 | 14.7 |

Example 9

247 g of a polydimethylsiloxane with dimethoxyvinylsilyl end groups and of a viscosity of 100,000 mPa·s, 164 g of a trimethylsilyl-end-terminated polydimethylsiloxane with a viscosity of 1000 mPa·s, 2.1 g of an octylphosphonic acid mixture composed of 25% trimethoxymethylsilane and 75% octylphosphonic acid, 14.0 g of vinyltriethoxysilane, and 10.5 g of N-aminoethylaminopropyltrimethoxysilane are homogenized in a laboratory planetary mixer for 3 minutes at about 300 rpm and a pressure of 200-300 hPa. Then 228 g of a ground, uncoated marble flour having an average particle size of 2 μm and 31.5 g of a hydrophilic, pyrogenic silica having a specific surface area of 150 m$^2$/g are mixed in slowly at a pressure of 900-1100 hPa and dispersed for 8 minutes at 800 rpm and a pressure of 200-300 hPa. Lastly, the resulting paste is activated with 3.5 g of a tin catalyst, prepared by reaction of di-n-octyltin oxide, tetraethoxysilane, and aminopropyltriethoxysilane at 300 rpm and a pressure of 200-300 hPa for 3 minutes and stirred to remove bubbles.

The composition thus produced was dispensed for keeping into moisture-tight containers and prior to the further tests was stored at 23° and 50% relative atmospheric humidity for 24 hours.

The resulting compositions are thereafter investigated as described or crosslinked at 23° C. and 50% relative atmospheric humidity for 14 days, with the mechanical properties and Shore hardnesses being determined according to ISO 37 and ISO 868, respectively. The results are found in table 5.

Example 10

The procedure described in example 9 is repeated, with the modification that instead of the polydimethylsiloxane having dimethoxyvinylsilyl end groups, a polydimethylsiloxane having dimethoxyvinylsilyl and dimethoxymethylsilyl end groups is used.

The results are found in table 5.

Comparative Example C11

The procedure described in example 9 is repeated, with the modification that instead of the polydimethylsiloxane having dimethoxyvinylsilyl end groups, a polydimethylsiloxane having dimethoxymethylsilyl end groups is used.

The results are found in table 5.

TABLE 5

| Examples 9-10 and C11 | | | |
|---|---|---|---|
| Example | 9 | 10 | C11 |
| Paste properties | | | |
| Skin-forming time [min] | 10 | 19 | 14 |
| Tackiness | pos. | pos. | pos. |
| Early stability | | | |
| 30 min | pos. | pos. | neg. |
| 60 min | | | pos. |
| Volume curing (wedge method) | | | |
| 1 day [mm] | 2.9 | 2.8 | 2.7 |
| 2 days [mm] | 4.1 | 4.1 | 3.9 |
| 3 days [mm] | 5.1 | 5.0 | 4.7 |
| Mechanical properties of foil to ISO 37-S2 | | | |
| 100% modulus [MPa] | 0.46 | 0.44 | 0.49 |
| Tensile strength [MPa] | 1.47 | 1.38 | 1.44 |
| Elongation at break [%] | 398 | 372 | 349 |
| Shore A hardness to ISO 868 | | | |
| Shore A top | 25.0 | 26.1 | 29.9 |
| Shore A bottom | 18.3 | 16.9 | 20.3 |

The invention claimed is:
1. A crosslinkable composition, comprising:
(A) organopolysiloxane(s) containing organyloxy groups and comprising units of the formula (I)

$$R_a R^1_b (OR^2)_c SiO_{(4-a-b-c)/2} \quad (I),$$

where
$R$ are identical or different and represent monovalent, SiC-bonded, optionally substituted hydrocarbyl radicals that are free from aliphatic carbon-carbon multiple bonds,
$R^1$ are identical or different and denote monovalent, SiC-bonded, optionally substituted hydrocarbyl radicals having aliphatic carbon-carbon multiple bonds,
$R^2$ are identical or different and denote monovalent, optionally substituted hydrocarbyl radicals,
a is 0, 1, 2 or 3,
b is 0 or 1, and
c is 0, 1, 2 or 3,
with the proviso that in formula (I) the sum a+b+c≤3 and b and c are other than 0 in at least one unit,
(B) organosilicon compounds of the formula (II)

$$(R^4O)_d SiR^3_{(4-d)} \quad (II),$$

where
$R^3$ are identical or different and denote monovalent, SiC-bonded, optionally substituted hydrocarbyl radicals,
$R^4$ are identical or different and denote hydrogen or monovalent, optionally substituted hydrocarbyl radicals, and
d is 2, 3 or 4,
with the proviso that in organosilicon compound (B) there is at least one radical $R^4$ having at least two carbon atoms, and/or their partial hydrolysates,
and
(C) organosilicon compounds containing basic nitrogen of the formula (III)

$$(R^6O)_e SiR^5_{(4-e)} \quad (III),$$

where
$R^5$ are identical or different and denote monovalent, SiC-bonded radicals containing basic nitrogen,
$R^6$ are identical or different and denote hydrogen or monovalent, optionally substituted hydrocarbyl radicals, and
e is 2 or 3,
and/or their partial hydrolysates, wherein the organosilicon compounds (C) are one or more of 3-aminopropyltrimethoxysilane, 3-aminopropyltriethoxysilane, 3-aminopropylmethyldimethoxysilane, 3-aminopropylmethyldiethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-phenyl-3-aminopropyltrimethoxysilane, N-phenyl-3-aminopropylmethyldimethoxysilane, N-phenyl-3-aminopropyltriethoxysilane or N-phenyl-3-aminopropylmethyldiethoxysilane, or N-alkyl or N,N-dialkyl derivatives of 3-aminopropyltrimethoxysilane, 3-aminopropyltriethoxysilane, 3-aminopropylmethyldimethoxysilane or 3-aminopropylmethyldiethoxysilane or their partial hydrolysates, where the N-alkyl radicals are methyl, ethyl, n-propyl, isopropyl, n-butyl, isobutyl, tert-butyl, cyclohexyl or branched or unbranched pentyl or hexyl radicals.

2. The crosslinkable composition of claim 1, wherein organopolysiloxane(s) (A) are substantially linear, organyloxyterminated organopolysiloxanes of the formula (IV)

$$(OR^2)_{3-f} R^1_f Si—(SiR_2—O)_g—SiR^1_f (OR^2)_{3-f} \quad (IV)$$

where
R, $R^1$ and $R^2$ are each identical or different,
g is 30 to 5000, and
f is 0, 1 or 2,
with the proviso that in formula (IV) f is other than 0 in at least one unit.

3. The crosslinkable composition of claim 1, wherein at least one organopolysiloxane (A is
(MeO)$_2$MeSiO[SiMe$_2$O]$_{200-2000}$SiVi(OMe)$_2$
(MeO)$_2$ViSiO[SiMe$_2$O]$_{200-2000}$SiVi(OMe)$_2$,
(MeO)$_2$MeSiO[SiMe$_2$O]$_{200-2000}$SiViMe(OMe),
(MeO)ViMeSiO[SiMe$_2$O]$_{200-2000}$SiViMe(OMe) or
(MeO)ViMeSiO[SiMe$_2$O]$_{200-2000}$SiVi(OMe)$_2$.

4. The crosslinkable composition of claim 2, wherein at least one organopolysiloxane (A is
(MeO)$_2$MeSiO[SiMe$_2$O]$_{200-2000}$SiVi(OMe)$_2$
(MeO)$_2$ViSiO[SiMe$_2$O]$_{200-2000}$SiVi(OMe)$_2$,
(MeO)$_2$MeSiO[SiMe$_2$O]$_{200-2000}$SiViMe(OMe),
(MeO)ViMeSiO[SiMe$_2$O]$_{200-2000}$SiViMe(OMe) or
(MeO)ViMeSiO[SiMe$_2$O]$_{200-2000}$SiVi(OMe)$_2$.

5. The crosslinkable composition of claim 1, wherein organosilicon compounds (B) are silanes having at least one ethoxy radical or their partial hydrolysates.

6. The crosslinkable composition of claim 1, wherein organosilicon compounds (B) are one or more of tetraethoxysilane, methyltriethoxysilane, dimethyldiethoxysilane, vinyltriethoxysilane, vinylmethyldiethoxysilane, phenyltriethoxysilane, phenylmethyldiethoxysilane or their partial hydrolysates.

7. The crosslinkable composition of claim 1, wherein the weight ratio of component (B) to component (C) is in the range from 2:1 to 1:2.

8. The crosslinkable composition of claim 1, which comprises:
(A) organopolysiloxane(s) composed of units of the formula (I),
(B) organosilicon compound(s) of the formula (II) having at least one ethyl radical $R^4$ and/or their partial hydrolysates, (C) organosilicon compounds containing basic nitrogen and of the formula (III) and/or their partial hydrolysates,
(D) optionally plasticizers,
(E) optionally fillers,
(F) optionally catalysts,
(G) optionally stabilizers, and
(H) optionally additives.

9. A method for producing a crosslinkable composition of claim 1, comprising mixing all of the constituents with one another in any order.

10. A molding produced by crosslinking a composition of claim 1.

* * * * *